Dec. 15, 1931.  A. O. COBBS  1,836,154
HOLDER FOR SECURING CERTIFICATES TO THE STEERING COLUMNS OF VEHICLES
Filed March 2, 1931
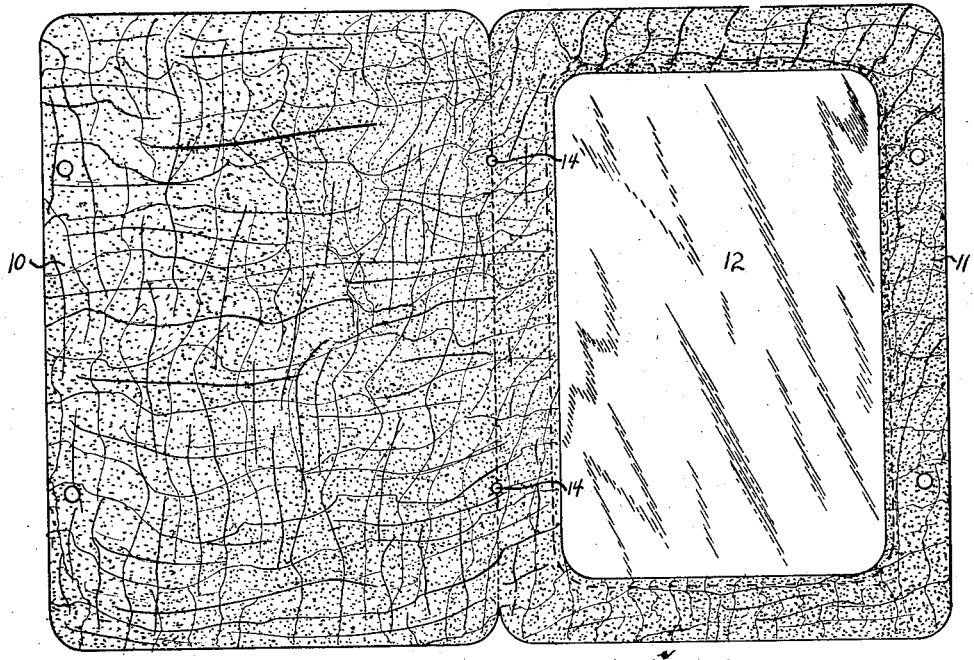
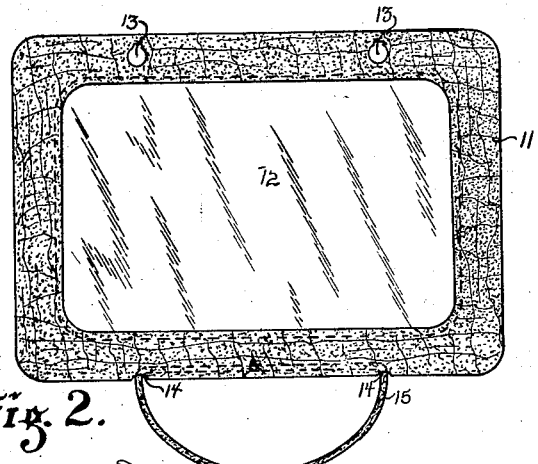
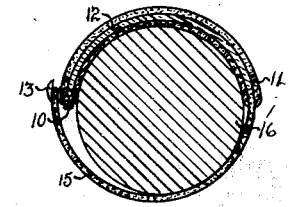
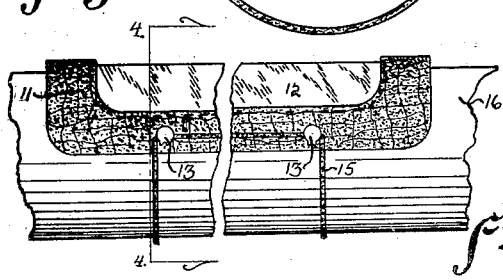
INVENTOR.
A. O. Cobbs
BY M. Talbert Dick
ATTORNEY.

Patented Dec. 15, 1931

1,836,154

UNITED STATES PATENT OFFICE

ANSALEM ORVILLE COBBS, OF DES MOINES, IOWA

HOLDER FOR SECURING CERTIFICATES TO THE STEERING COLUMNS OF VEHICLES

Application filed March 2, 1931. Serial No. 519,500.

The principal object of my invention is to provide a holder for displaying documents inside an automotive vehicle, such as license certificates, drivers' licenses and the like.

A further object of this invention is to provide a certificate holder that may be easily and quickly attached to or detached from the steering column of an automotive vehicle.

A still further object of my invention is to provide a certificate holder that successfully displays a certificate which may be seen and read from a position inside the seating compartment of a vehicle as well as from a position outside of the vehicle.

A still further object of my invention is to provide an identification or certificate holder for holding automobile license certificates, drivers' licenses or the like, that may be easily installed in the seating compartment of a vehicle without permanently damaging or detracting from the appearance of the vehicle.

A still further object of this invention is to provide an identfication or certificate holder that is capable of having a certificate easily and quickly placed in the same or removed from the same.

A still further object of my invention is to provide a holder for the displaying of a certificate in the seating compartment of an automotive vehicle, such as an automobile, truck or the like that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a plan view of the flexible base portion of the invention such as leather, leatherette or the like, after it has been cut and a transparent sheet of material has been attached to it, but before the same has been folded to form the back portion and front portion of the certificate holder.

Fig. 2 is a reduced top plan view of the certificate holder ready for use.

Fig. 3 is a side view of the holder secured to the steering column of an automotive vehicle with parts broken for the conservation of space.

Fig. 4 is a cross sectional view of my invention mounted on the steering column of the vehicle or like, to more fully illustrate its construction and is taken on line 4—4 of Fig. 3.

Many devices have been placed on the market for displaying drivers' licenses, automobile certificates and the like inside the seating compartment of vehicles. Most of these holders as is well known are of the rigid frame construction and are secured in the seating compartment of the vehicle by bolts, screws and the like, thereby making them not only difficult to install but permanently damaging the vehicle and detracting from its refined appearance. Furthermore, certificate holders of this type do not permit the ready placement or removal of the certificates in the holder. I have overcome such objections by providing a flexible visible certificate holder of novel construction that may be quickly attached to or detached from the steering column of a vehicle.

The base portion of my invention is made from a single rectangular sheet of flexible material, such as leather, leatherette or the like. This sheet is doubled equally back upon itself to form the back portion 10 of a certificate holder and the front portion 11 of a certificate holder, as shown in Fig. 2. This creates a rectangular design of pleasing and desirable dimensions. In the front portion 11 is an opening which is enclosed by transparent material 12 such as celluloid, isinglass or the like. This opening which is closed by the transparent material is of elongated rectangular design extending transversely of the longitudinal axis of the elongated base sheet of flexible material before the same has been folded.

The transparent sheet material 12 may be secured to the front portion 11 by sewing or other suitable means as desired. By such a construction if a document or certificate is placed between the back portion 10 and the front portion 11, it may be easily seen and read through the transparent sheet 12. The numeral 13 designates two hook rivets spaced apart and extending through the outer marginal side portions of the back portion 10 and front portion 11, as shown in the drawings. The numeral 14 designates two spaced apart holes on the imaginary line where the front and back portions are folded, as shown in Fig. 1. These holes 14 are somewhat greater distance apart than the two hook rivets are distant from each other. The numeral 15 designates an elastic cord of loop construction by having its two ends inserted through the holes 14, respectively and tied as shown in dotted lines in Fig. 2. This completes my certificate holder and to attach it around a steering column 16, it is merely necessary to fold the certificate holder partially around the column and manually draw the elastic cord around the balance of the column and hook the same on the two hook members 13, as shown in Fig. 3. To accomplish this it is necessary to stretch the cord 15, thereby yieldingly holding the certificate holder tightly on the steering column and inside the seating compartment of the vehicle, in which position it may be easily viewed from a position inside the vehicle as well as from a position outside of the vehicle. To remove the certificate holder from the steering column it is merely necessary to stretch the cord 15 and unhook it from the hook rivets 13.

In order that the cord 15 will extend in a desirable straight line and properly hold the certificate holder when the same is on the steering column, the holes 14 through which the cord 15 extends are slightly further apart from each other than the hook rivets are from each other, as has heretofore been explained. As the certificate holder is yieldingly held in a taut condition on the steering column it will not only stay in any position it is placed, but will yieldingly prevent the accidental removal of the certificate from between the back portion 10 and face 12. Also it will be noted that the certificate holder will develop no rattle or noise while the vehicle to which it is secured is in motion.

From the foregoing it will readily be appreciated that I have provided a holder for certificates that is easily manufactured, is durable in use and is refined in appearance.

Some changes may be made in the construction and arrangement of my improved holder for securing a certificate to the steering wheel of a vehicle, without departing from the real spirit and purpose of my invention, and it is my intention to cover by my claims any modified forms of structure or use of mechanical equivalents which may be reasonably included within their scope.

I claim:

1. In a device of the class described, a single strip of flexible material folded back upon itself near its center to form a back portion and a front portion of the certificate holder and having an opening in said front portion and two spaced apart holes positioned at points where it is folded, a sheet of transparent flexible material for closing the opening in said front portion, a hook member secured to the marginal side portion of said front portion, and a continuous loop of elastic cord extending through said two holes.

2. In a device of the class described, a single strip of flexible material folded back upon itself near its center to form a back portion and a front portion of the certificate holder and having an opening in said front portion and two spaced apart holes positioned at points where it is folded, a sheet of transparent flexible material for closing the opening in said front portion, two spaced apart hook rivets extending through the outer marginal side portions of said back and front portions, and a continuous elastic cord extending through said two holes.

ANSALEM ORVILLE COBBS.